April 4, 1950 W. L. WEEKS ET AL 2,503,016
LUBRICANT SCAVENGING PUMP MEANS
Filed Aug. 5, 1944

INVENTORS
WALTER L. WEEKS.
CHARLES A. STEWART.
WILLIAM H. HOLMES.
BY
ATTORNEY

Patented Apr. 4, 1950

2,503,016

UNITED STATES PATENT OFFICE 2,503,016

LUBRICANT SCAVENGING PUMP MEANS

Walter L. Weeks, East Wyckoff, Charles A. Stewart, Westfield, and William H. Holmes, Upper Montclair, N. J., assignors to Wright Aeronautical Corporation, a corporation of New York Application August 5, 1944, Serial No. 548,254

4 Claims. (Cl. 184—6)

This invention relates to pumps, and more particularly to positive displacement gear pumps, and although the invention is disclosed in connection with the lubrication system of an internal combustion engine, the invention is of general application.

The lubrication system of modern aircraft engines generally comprises a dry sump system in which an engine driven oil pump draws lubricating oil from a reservoir, and supplies it under pressure to the engine parts to be lubricated from which the oil drains into a sump, and an engine driven scavenge pump operates to return the oil from the sump to the reservoir. In order to insure removal of substantially all the oil from the sump under all engine operating conditions, the scavenge pump is provided with a capacity more than sufficient for returning all the oil from the sump to the reservoir under the most adverse pump operating conditions. Accordingly, the scavenge pump returns a considerable amount of air and other gases, as well as oil to the oil supply reservoir. The air and other gases become entrained within the oil and are only partially separated in the oil reservoir. This entrainment of air and/or gases within the engine lubricating oil supplied to the lubricating pump considerably reduces the quantity of oil delivered by this pump.

It is an object of this invention to provide means for removing at least a portion of the air and/or gases delivered by the engine driven scavenge pump or pumps. It is a further object of this invention to prevent the formation of large gas pressures in the discharge chamber of the pump in the event the pump becomes unprimed since this gas pressure may blow back through the pump to strip the pump clearances of oil, thereby rendering it difficult for the pump to reprime itself. The invention consists in the provision of a bleed from the discharge chamber of the scavenge pump and through which the air and/or other gases delivered by the pump can escape, thereby reducing the quantity of gases entrained within the oil. In addition, because the gases can escape from the discharge chamber through this bleed, the discharge chamber remains substantially full of oil, even though the pump becomes unprimed, and therefore, the pump clearances will remain sealed and the pump will readily reprime itself, when oil is again available. Although the invention is disclosed in connection with a lubrication system of an aircraft engine, it obviously is of general application, and can be used with any gear pump which has a capacity greater than the rate at which liquid enters the pump or to any such pump which may become unprimed.

Other objects of the invention will become apparent upon reading the annexed detailed description in connection with the drawing in which.

Figure 1:
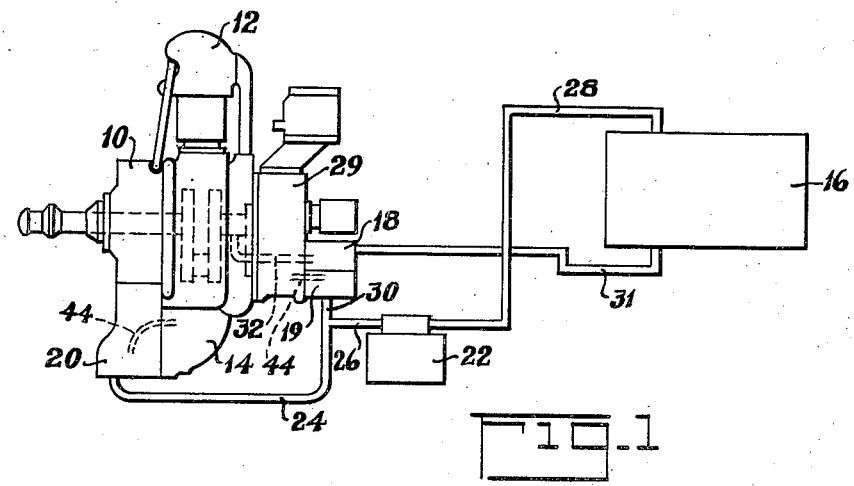
Figure 1 is a schematic view of a lubrication system for an internal combustion engine.

Referring to the drawing, a conventional radial cylinder internal combustion engine 10 is provided with a bank of radially disposed cylinders 12 and an engine sump 14. The lubrication system of the engine comprises an oil supply tank or reservoir 16, an engine driven oil pump 18, engine driven scavenge pumps 19 and 20, and an oil cooler 22. Each of the pumps 18, 19 and 20 is a rotary positive displacement type gear pump, e. g., these pumps may be conventional gear pumps comprising a pair of spur gears. The scavenge pump 20 is arranged to draw oil from the engine sump 14 and to pump the oil into the oil supply tank 16 by way of lines 24 and 26, oil cooler 22, and line 28. The scavenge pump 19 has a smaller capacity than the pump 20, and operates to pump oil from the rear engine section 29 to the oil supply tank 16 by way of lines 30 and 26, oil cooler 22, and line 28. A line 31 connects the inlet side of the pump 18 to the bottom of the oil tank, and this pump delivers oil under pressure to the various bearing surfaces of the engine through passages such as 32. In order to insure substantially complete removal of all the oil from the engine sump under all operating conditions, the scavenge pump 20 is made oversize. This is essential in order to prevent oil from overflowing the sump into the lower cylinders of the engine. The result is that only part of the capacity of the scavenge pump 20 is effective for pumping oil back into the oil tank, the remainder of the capacity of the pump being effective to pump air or other gases into the oil tank. Similarly, the capacity of the scavenge pump 19 is in excess of its normal requirement, and therefore, a considerable quantity of gases becomes entrained within the oil returned to the tank 16. The structure so far described is quite conventional.

The gases entrained within the oil are objectionable because only a portion of these gases separate out from the oil in the oil tank and therefore the pump 18 delivers gases as well as oil, thereby reducing the quantity of lubricating oil delivered by the pump 18 to the engine. Also, when, for example, pump 19 or 20 becomes unprimed, the gas pressure built up in its discharge chamber tends to blow back through the pump gears, thereby stripping these gears of oil, and making it difficult for the pump to reprime itself. This condition is aggravated in the case of the pump 19 which has a smaller capacity than the pump 20. Thus, when the pump 19 becomes unprimed, the gases delivered by the pump 20 to the Y connection between lines 19, 26 and 30 also tend to blow back through line 30 and the gears of pump 19.

Figures 2, 3:
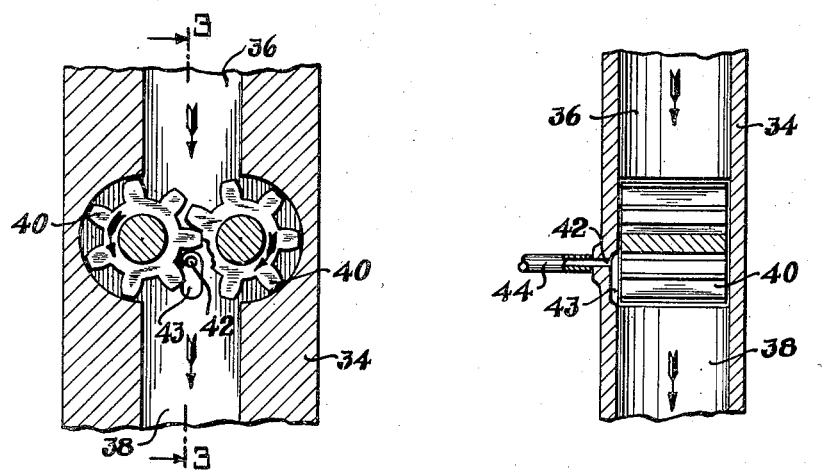
Figure 2 is a sectional view through a scavenge pump used in the system of Figure 1.
Figure 3 is a sectional view taken along line 3—3 of Figure 2.

To overcome these difficulties, both scavenge pumps 19 and 20 are preferably modified as illustrated in the vertical pump section of Figure 2, and as further illustrated in Figure 3. Either scavenge pump comprises a casing 34, an inlet chamber 36, a discharge chamber 38, and a pair of meshing spur gears 40. A bleed opening 42 is provided out through the pump casing from the vicinity of the meshing engagement of the gears 40 at one end of the gears and on their discharge side. The exact location of this bleed opening in the vicinity of meshing engagement of the gears is not critical. This opening may be vented to the atmosphere or to any suitable space of relatively low pressure and preferably is connected back into the engine crank case through a line 44.

With this arrangement, upon operation of the pump, the region of the bleed opening 42 is primarily occupied by the gases delivered by the pump, the relatively heavy oil being thrown away from this region by the gears 40. As a result, a substantial portion of the gases delivered by the pump escapes through the bleed opening 42.

At this point it should be noted that if desired, a second bleed opening may be provided through the pump casing at the other end of the discharge side of the pump gears. Preferably the one or more bleed openings 42 actually open into the discharge chamber of the pump at a point in which the gear teeth are in meshing engagement. Then, in view of the trapping action of the meshing gear teeth, a high pressure is built up between these gear teeth forcing the gases out from between the teeth through the bleed opening or openings 42. Also, in order to further facilitate the escape of the gases delivered by the pump through the bleed opening 42, a groove or recess 43 may be provided along the inner wall of the pump casing from the bleed opening 42 to a point downstream therefrom clear of the gear teeth, as illustrated. However, the groove 43 is not essential to the function of the bleed opening 42.

With the scavenge pumps 19 and 20 each provided with a bleed opening 42, the quantity of gases entrained in the oil returning to the supply tank 16 is substantially reduced. Some oil will also escape through the bleed opening 42 back into the engine crank case and sump, but this is not objectionable, since the scavenge pumps 19 and 20 are provided with a capacity considerably in excess of that normally required. Also, if either of the pumps 19 or 20 should become unprimed, the gas delivered to the discharge side of this pump can readily escape through the bleeding opening 42 back into the engine crank case instead of blowing back through the pump gears, and therefore, the discharge chamber or port 38 of the pump will remain substantially full of oil, and the pump gears will run in oil, thereby keeping the pump clearances sealed. These operations and functions of the bleed opening 42 are the same, regardless of the orientation of the pump gears or the orientation of its inlet and outlet ports. As illustrated in Figure 2, the pump gears are mounted for rotation about horizontal axes with the pump discharging downwardly, but obviously the bleed opening 42 would function just the same, even though the pump were modified so that it discharged upwardly or horizontally or if the pump gears were mounted for rotation about vertical axes. However, if the pump gears were mounted for rotation about vertical axes, then with but a single bleed opening 42, it preferably should be disposed adjacent the upper end of the gears.

Figure 4:
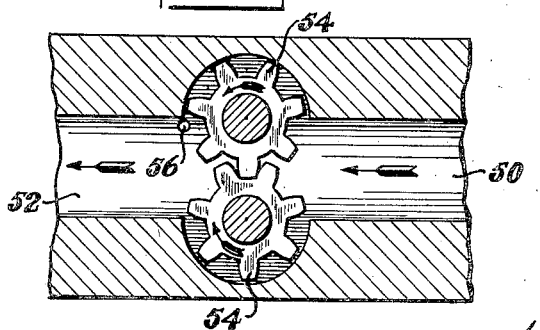
Figure 4 is a sectional view of a modification.

With the pump arranged to discharge horizontally and with the pump gears mounted for rotation about vertically spaced horizontal axes, it is also desirable to locate a bleed opening at the upper zone of the pump discharge chamber adjacent to the upper gear either in addition to or in lieu of the bleed opening provided adjacent the meshing zone of the gears. Figure 4 illustrates such a construction in which the pump is provided with an inlet chamber 50, an outlet chamber 52 and a pair of meshing spur gears 54. With the arrangement as illustrated in Figure 4, the gases delivered by the pump tend to collect at the upper zone of the pump discharge chamber 52. Therefore, when the pump became unprimed, these gases, under the pump back pressure, would tend to blow back through the upper gear 54, thereby tending to strip this gear of oil and making it difficult for the pump to reprime itself. To overcome this difficulty, a bleed opening 56 is disposed at the upper zone of the discharge chamber adjacent the upper gear 54. This opening may also be connected back into the engine crank case as in the case of the bleed opening 42. In this way, any gases collecting in the upper zone of the pump discharge chamber can readily escape through the bleed opening 56, and therefore, both pump gears will continue to run in oil while the pump is unprimed.

Although the invention has been disclosed in connection with scavenge pumps of an engine lubrication system, the invention is not so limited but is of general application. Thus, the invention can be applied to any rotary gear pump which has a capacity greater than the quantity of liquid which enters the pump, or which at times may become unprimed during operation.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine lubrication system comprising an oil supply reservoir and a pair of engine driven scavenge pumps for returning oil through a common conduit to said reservoir, each of said pumps comprising a pair of meshing spur gears and having a bleed opening in its discharge side in the region of meshing engagement of its gears.

2. In an engine lubrication system comprising an engine, an oil supply reservoir, and an engine driven positive displacement pump, said pump comprising a housing having rotatable pumping elements mounted therein for returning oil to said reservoir from said engine, said housing having a bleed opening in its discharge side immediately adjacent to the path of rotation of said pump elements, said bleed opening communicating with the housing of said engine.

3. In an engine lubrication system comprising an oil supply reservoir, an engine driven positive displacement pump, said pump comprising a housing having rotatable pumping elements mounted therein for returning oil to said reservoir from said engine, said housing having a bleed opening on its discharge side immediately adjacent to the path of rotation of said pump elements.

4. In an engine lubrication system comprising an oil supply reservoir, an engine driven positive displacement pump comprising a housing having a pair of meshing spur gears, said gears being rotatable to pump oil from said engine to said supply reservoir and said housing having a bleed opening on its discharge side in the region of meshing engagement of said gears.

WALTER L. WEEKS.
CHARLES A. STEWART.
WILLIAM H. HOLMES.

REFERENCES CITED

The following references are of record in the file of this patent:

UNITED STATES PATENTS

| Number | Name | Date |
| --- | --- | --- |
| 1,485,537 | Vincent | Mar. 4, 1924 |
| 2,140,735 | Clark | Dec. 20, 1938 |
| 2,223,112 | Lear | Nov. 26, 1940 |
| 2,229,231 | Weyenberg | Jan. 21, 1941 |
| 2,246,951 | Peter | June 24, 1941 |
| 2,316,729 | Tryon | Apr. 13, 1943 |
| 2,362,724 | Shea | Nov. 14, 1944 |
| 2,443,875 | Spangenberger | June 22, 1948 |

FOREIGN PATENTS

| Number | Country | Date |
| --- | --- | --- |
| 493,553 | Great Britain | Oct. 11, 1938 |
| 880,952 | France | Jan. 11, 1943 |